(12) United States Patent
Chevalier et al.

(10) Patent No.: US 10,723,891 B2
(45) Date of Patent: Jul. 28, 2020

(54) AQUEOUS COATING COMPOSITION

(71) Applicants: Dow Silicones Corporation, Midland, MI (US); Pierre Chevalier, Lille (BE); Emmanuelle Deloffre, Gerpinnes (BE); Cathy Dontaine, Mesvin (BE)

(72) Inventors: Pierre Chevalier, Lille (BE); Emmanuelle Deloffre, Gerpinnes (BE); Cathy Dontaine, Mesvin (BE)

(73) Assignee: Dow Silicones Corporation, Midland, MI (US)

( * ) Notice: Subject to any disclaimer, the term of this patent is extended or adjusted under 35 U.S.C. 154(b) by 100 days.

(21) Appl. No.: 16/069,964

(22) PCT Filed: Apr. 21, 2017

(86) PCT No.: PCT/EP2017/059484
§ 371 (c)(1),
(2) Date: Jul. 13, 2018

(87) PCT Pub. No.: WO2017/186586
PCT Pub. Date: Nov. 2, 2017

(65) Prior Publication Data
US 2019/0062563 A1   Feb. 28, 2019

(30) Foreign Application Priority Data

Apr. 25, 2016  (GB) .................................. 1607155.7

(51) Int. Cl.
| | | |
|---|---|---|
| C09D 5/02 | (2006.01) | |
| C09D 5/00 | (2006.01) | |
| C08J 7/04 | (2020.01) | |
| C09D 129/06 | (2006.01) | |
| C09D 183/04 | (2006.01) | |
| D21H 19/12 | (2006.01) | |

(52) U.S. Cl.
CPC ............ C09D 5/022 (2013.01); C08J 7/0427 (2020.01); C09D 5/00 (2013.01); C09D 129/06 (2013.01); C09D 183/04 (2013.01); D21H 19/12 (2013.01); C08J 2329/06 (2013.01); C08J 2383/07 (2013.01); C08J 2429/06 (2013.01); C08J 2483/05 (2013.01); C08J 2483/07 (2013.01)

(58) Field of Classification Search
CPC ........ C09D 5/022; C09D 5/00; C09D 129/06; C09D 183/04; C08J 7/0427; C08J 2329/06; C08J 2383/07; C08J 2429/06; C08J 2483/05; C08J 2483/07; D21H 19/12
See application file for complete search history.

(56) References Cited

U.S. PATENT DOCUMENTS

| | | |
|---|---|---|
| 2,869,722 A | 1/1959 | Marander et al. |
| 3,159,601 A | 12/1964 | Ashby |
| 3,220,972 A | 11/1965 | Lamoreaux |
| 3,296,291 A | 1/1967 | Chalk et al. |
| 3,419,593 A | 12/1968 | Willing |
| 3,516,946 A | 6/1970 | Modic |
| 3,814,730 A | 6/1974 | Karstedt |
| 3,989,668 A | 11/1976 | Lee et al. |
| 4,127,460 A | 11/1978 | Gaske et al. |
| 4,766,176 A | 8/1988 | Lee et al. |
| 4,784,879 A | 11/1988 | Lee et al. |
| 5,017,654 A | 5/1991 | Togashi et al. |
| 5,036,117 A | 7/1991 | Chung et al. |
| 5,095,067 A | 3/1992 | Hara et al. |
| 5,175,325 A | 12/1992 | Brown et al. |
| 5,500,148 A | 3/1996 | Ohba et al. |
| 5,645,751 A | 7/1997 | Haley |
| 5,672,428 A | 9/1997 | Muschelweicz et al. |
| 5,683,527 A | 11/1997 | Angell et al. |
| 5,998,536 A | 12/1999 | Bertry et al. |
| 6,306,411 B1 | 10/2001 | Jager Lezer |
| 6,403,704 B1 | 6/2002 | Bara |
| 6,410,134 B1 | 6/2002 | Park et al. |
| 6,806,339 B2 | 10/2004 | Cray et al. |
| 7,378,482 B2 | 5/2008 | Asch et al. |
| 7,459,213 B2 | 12/2008 | Yamamoto et al. |
| 7,666,940 B2 | 2/2010 | Lengo et al. |
| 7,981,961 B2 | 7/2011 | Heller et al. |
| 8,101,683 B2 | 1/2012 | Irifune et al. |

(Continued)

FOREIGN PATENT DOCUMENTS

| | | |
|---|---|---|
| CN | 102337031 | 2/2012 |
| DE | 102004017584 | 10/2005 |

(Continued)

Primary Examiner — Michael C Miggins

(57) ABSTRACT

This invention relates to an aqueous coating composition, a greaseproof article and a process of forming a coating on a substrate. The aqueous coating composition comprises at least the following components: an organopolysiloxane (A) which is a polysiloxane compound having at least two alkenyl groups per molecule, an organohydrogenpolysiloxane (B) which is a polysiloxane compound comprising at least two Si H groups per molecule, an hydrosilylation catalyst (C) able to catalyse an hydrosilylation reaction between the organopolysiloxane compound (A) and the organohydrogenpolysiloxane compound (B), an organic copolymer (D) comprising at least two types of repeating units (i) and (ii): unit (i) which is an alkyl group comprising from 2 to 2 carbon atoms, unit (ii) which is an alkyl group comprising from 2 to 12 carbon atoms and having at least one pendant alcohol substituent, water, and the composition is able to form upon curing by hydrosilylation a coating on a substrate.

19 Claims, No Drawings

(56) References Cited

U.S. PATENT DOCUMENTS

| | | |
|---|---|---|
| 8,232,346 B2 | 7/2012 | Duffy et al. |
| 9,120,935 B2 | 9/2015 | Marrot et al. |
| 9,562,149 B2 | 2/2017 | Cray et al. |
| 2003/0008042 A1 | 1/2003 | Khalsa et al. |
| 2004/0161618 A1 | 8/2004 | Griswold et al. |
| 2005/0119406 A1 | 6/2005 | Duffy et al. |
| 2006/0089427 A1 | 4/2006 | Yamamoto et al. |
| 2008/0311333 A1 | 12/2008 | Yoon et al. |
| 2010/0240842 A1 | 9/2010 | Frank et al. |
| 2013/0189889 A1 | 7/2013 | Creutz et al. |
| 2015/0190516 A1 | 7/2015 | Cauvin et al. |
| 2016/0376475 A1 | 12/2016 | Huang et al. |

FOREIGN PATENT DOCUMENTS

| | | |
|---|---|---|
| EP | 347895 | 12/1989 |
| EP | 484001 | 2/1993 |

AQUEOUS COATING COMPOSITION

This invention relates to an aqueous coating composition, a greaseproof article and a process of forming a coating on a substrate.

Compositions, especially reactive compositions, can be used to form upon curing a coating on a substrate to improve or change various properties of the substrate. The substrate to which the compositions are applied can contain one or more materials. Such materials can be fibrous and preferably cellulosic, most preferably paper substrates such as Kraft paper, cardboard, corrugated cardboard, and the like. The paper may be glazed or unglazed, calendared or un-calendared. Lignocellulosic substrates are also suitable, for example chip board, low, medium, and high density fiberboard, and the like. In other instances the substrate can be plastics-based instead of paper-based, comprising for example acrylic or polyethylene terephtalate material, or it can be a laminate paper/plastics or a textile based material.

The material can also contain natural or synthetic fibrous material such as glass fibres, acetate fibre, polyester or cotton fibre. For the sake of convenience the term paper will often be used in the present description as for most of the applications, the substrate contains a paper based material. Nevertheless the term paper may encompass depending on the context other types of materials used as substrate in the present invention.

Reactive compositions can be aqueous, solvent based or solventless compositions. Solventless compositions often have high viscosities hence their handling may be difficult and coating processes could be different compared to solvent- or water-based systems especially for achieving low thickness deposition. Solvents are typically organic compounds and may require heating and/or time to evaporate and are preferably avoided for environmental reasons or health reasons. Aqueous compositions are therefore desired in several applications like for those requiring well controlled low thickness deposition and those bound to food regulations like indirect food contact applications.

When aqueous composition is preferred, the composition can contain one or more components that can be dissolved in water, because the component is soluble or dispersible in water. This dissolution can be done at ambient temperature (25° C.) or at higher temperature and can be done up to a certain concentration linked to the nature of the component.

Greaseproof properties might be sought after for different products and articles such as paper or paperboard of different grammage in very wide range of applications including food applications like packaging or baking but also in composite filter for extractor or filter hoods as well as in any applications were anti-staining or anti-fingerprint protection is required.

Paper is typically a material in thin form obtained or derived from fibres of cellulose pulp from wood and other plant sources. Paper is usually available in thin sheets, bags or other containers. Paper can contain additives and/or can be treated to improve its properties such as resistance to various chemicals, harsh environments, or printability.

Treated papers or special grades papers are useful in food related applications. Baking paper also called parchment paper or bakery release paper is typically made of paper that has at least one non-stick surface that resists to cooking temperatures. The heat resistant, non-stick surface is obtained for example by treating the paper with sulphuric acid and/or with a silicone coating. Sulphuric acid paper treatment provides mechanical strength, low permeability and greaseproofness. The paper can be treated with silicone composition to provide a silicone coating that enables water barrier and anti-adhesive performances for improved cold or warm food release.

Greaseproof papers permit to pack food or wrap fatty food in sheets, wrappers and other containers. They can be used as interleavers for sliced food like sliced cheese, bacon, Deli meat, salmon, cookie dough or any other food and delicatessen. Greaseproof papers withstand oil and fatty food from permeating the paper and soiling it. Preferably the greaseproof paper has also release properties such as non-tackiness to prevent food from sticking to the paper at ambient temperature (anti-adhesive properties) and/or after use at high temperature (baking release properties). The greaseproof paper also has water repellent properties useful for steam cook food like dumpling, or for frozen food preventing upon de-freezing breakage, piercing or any damage to the paper packaging. Greaseproof papers can be made of special grades of papers, such as the so-called glassine, where cellulose fibres are treated to obtain a very low porosity, impeding grease and oil to penetrate in the paper. The paper can be treated with starch, alginate or cellulose gum to fill pores thereby hindering fatty products to penetrate the paper. Manufacturing such types of papers requires appropriate processes such as calendaring or supercalendaring demanding further investments in the paper making process line that can add significantly to the cost price of the finished paper.

Alternatively, greaseproof papers are obtained by treating papers with compounds forming an oil- and grease repellent layer on the paper. A known treatment is based on fluorinated compounds that are able to provide non-stick properties by forming a film having low surface energy, which is resistant to chemical agents thereby providing oil, fat and water repellence to the treated paper. However environmental and health concerns were raised about fluorinated compounds which seem to accumulate in the environment and the trend is to restrict or ban their use by various regulations, especially in the food packaging area.

Another approach has been to treat papers with a mixture of polyvinyl alcohol and a chromate-fatty acid complex. However the use of heavy metal such as chromium also raises environmental and health concerns in food packaging related uses.

Other treatments permit to confer some oleophobicity to the paper but they often require relatively high amounts of material to be effective and form a thick coating on the paper, which may be detrimental to the mechanical properties and durability upon creasing or folding of the paper and is not cost effective.

It is desirable to provide an alternative cost effective treatment of substrates for example paper that can provide greaseproof properties and at the same time meeting requirements on health and environment safety. The composition used for the substrate treatment should be preferably free of fluorinated compounds. The treatment should preferably be compatible with food contact requirements and meet the existing food contact materials regulations so as to be used in applications where the paper comes into contact with food. The treatment should provide significant advantages in reasonable amount of material deposited by area and be effective as a film or coating in limited thickness so as to minimize cost of the treatment.

Therefore the invention provides one or more of the following:

An aqueous coating composition comprising at least the following components:

An organopolysiloxane (A) which is a polysiloxane compound having at least two alkenyl groups per molecule, An organohydrogenpolysiloxane (B) which is a polysiloxane compound comprising at least two SiH groups per molecule, An hydrosilylation catalyst (C) able to catalyse an hydrosilylation reaction between the organopolysiloxane compound (A) and the organohydrogenpolysiloxane compound (B), An organic copolymer (D) comprising at least two different types of repeating units:
  unit (i) which is an alkyl group comprising from 2 to 12 carbon atoms
  unit (ii) which is an alkyl group comprising from 2 to 12 carbon atoms and having at least one pendant alcohol substituent Water, and the composition is able to form upon curing by hydrosilylation a coating on a substrate.

The composition as defined above wherein components (A) and (B) are comprised in one or more oil-in-water emulsions.

The composition as defined above wherein the copolymer (D) is water-soluble or water-dispersible.

The composition as defined above wherein the units (i) comprise ethylene units.

The composition as defined above wherein the units (ii) comprise vinyl alcohol units.

The composition as defined above wherein the copolymer (D) is ethylene-vinyl alcohol copolymer or ethylene-vinyl alcohol-vinyl ester copolymer.

The composition as defined above wherein the copolymer (D) comprises 0.1 to 25 mol % of ethylene units and the total content of vinyl alcohol units and vinyl ester units is from 75 to 99.9 mol %.

The composition as defined above further containing at least one of: hydrocolloid, polysaccharide, cellulose derivative, starch, alginate, carrageenan, gellan gum, locust bean gum, pectin, xanthan, guar gum, arabic gum, latex such as for example styrene-butadiene latex or styrene-acrylic latex.

The composition as defined above further containing maleic anhydride and/or at least one derivative of succinic anhydride, such as dodecyl, 2-methyl-2-propenyl, dodecenyl, octyl or octenyl succninc anhydride. Such additive can further improve the air permeability and gas barrier properties of the coating and consequently the grease barrier.

The composition as defined above wherein the alkenyl groups of component (A) are vinyl groups.

The composition as defined above wherein the H/Vinyl ratio range of components (A) and (B) is comprised between 1 and 3.

The composition as defined above wherein the weight ratio of component (D) to the siloxane components (A) and (B) is comprised between 0.01 and 10.

The composition as defined above wherein the components are present in separate parts or packages.

A greaseproof article comprising a substrate bearing a coating formed by curing the composition as defined above.

The greaseproof article as defined above wherein the substrate is made of paper, acrylic material or polyethylene terephthalate or paper/plastics laminate material.

The greaseproof article as defined above wherein the article is in form of a sheet, bag or container.

The greaseproof article as defined above wherein the article is used for food packaging.

The greaseproof article as defined above wherein the coating has a silicone weight of maximum 4 g/m$^2$, preferably maximum 2 g/m$^2$.

A process of forming a coating on a substrate using the composition as defined above.

The process as defined above wherein the composition is cured at a temperature comprised between 80 and 180° C., preferably 90-140° C., more preferably 100-120° C.

A process for the preparation of a coating composition as defined above wherein at least one of components (A), (B) and (C) is emulsified in one or more oil-in-water emulsion(s), and component (D) is dissolved in water either in one of the emulsions or in another part and all components (A), (B), (C) and (D) are mixed together in a following step.

Use of the composition as defined above to form a coating on a substrate, the coating providing at least one of the following properties: greaseproofness, food release, anti-adhesive release, air barrier, waterproofness, gas or water vapour barrier, printability.

It has been found that the composition as defined above is able to provide, after curing on a substrate, a coating which is meeting some desired properties such as: greaseproofness, effective cost in use, and approval under current food contact material regulations.

Furthermore the composition is able to form a coating having printability properties, which is often a desirable property especially for uses in packaging area.

The organopolysiloxane (A) containing alkenyl groups preferably has at least two silicon-bonded alkenyl-functional groups per molecule. The alkenyl group is preferably linear having up to 6 carbon atoms, as exemplified by hexenyl, vinyl, allyl or pentenyl, or may be cycloalkenyl such as cyclohexenyl. Vinyl groups may be preferred for cost and regulations reasons especially for food related uses.

The organopolysiloxane containing alkenyl groups can in general contain terminal and/or pendant alkenyl groups. The organopolysiloxane containing alkenyl groups can for example be a linear organopolysiloxane having the general formula

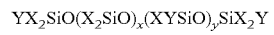

$$YX_2SiO(X_2SiO)_x(XYSiO)_ySiX_2Y$$

wherein each X denotes independently a phenyl group or an alkyl or cycloalkyl group having from 1 to 10 carbon atoms, for example, methyl, ethyl, propyl, butyl or cyclohexyl; each Y denotes an alkenyl group; and x and y are such that the organopolysiloxane has a viscosity at 25° C. is in the range from 5 to 5000 mm$^2$/s, more preferably 50 to 500 mm$^2$/s.

Such organopolysiloxanes are alkenyl-terminated polydiorganosiloxanes. The organopolysiloxane containing alkenyl groups can for example be a vinyl-terminated polydiorganosiloxane such as a dimethylvinylsiloxy-terminated polydiorganosiloxane, or a hexenyl terminated polydiorganosiloxane, such as a dimethyl (5-hexenyl)siloxy-terminated polydiorganosiloxane. Preferably, at least 50% of all the X substituents of the organopolysiloxane containing alkenyl groups (A) are methyl groups, most preferably all being methyl groups. It is possible but not preferred that small amounts (preferably less than 10% of all the substituents present) of other substituents are present, for example hydroxyl groups.

The organopolysiloxane containing alkenyl groups can be a branched siloxane comprising one or more Q units of the formula (SiO$_{4/2}$), from 15 to 995 D units of the formula $R^b{}_2SiO_{2/2}$ and M units of the formula $R^aR^b{}_2SiO_{1/2}$, wherein the $R^a$ and $R^b$ substituents are selected from alkyl groups having 1 to 6 carbon atoms and alkenyl groups having 2 to 6 carbon atoms. Preferably the $R^b$ substituents are alkyl groups, most preferably methyl groups. At least two, and preferably at least three, $R^a$ substituents in such a Q-branched siloxane are alkenyl groups, as described in EP-A-1070734. Vinyl groups can also be present if desired, as methylvinylsiloxane units. Such a siloxane may for example be a poly(dimethylsiloxane-silicate) copolymer having at least three vinyldimethylsilyl-terminated siloxane branches. The branched siloxane can also incorporate other terminal groups such as terminal trimethylsilyl ($SiMe_3$) and/or terminal hydroxydimethylsilyl ($SiMe_2OH$) groups. The Q branched siloxane can contain other additional branching groups, for example it can also incorporate $T^n$ units. Branched siloxanes have the advantage that they allow faster cure than linear polymers with similar viscosities.

The organopolysiloxane (A) is present in the aqueous composition in an amount of from 1 to 60% wt, alternatively of from 1 to 55% wt, alternatively of from 5 to 50% wt, based on the total weight of the aqueous composition.

The organohydrogenpolysiloxane (B) crosslinking agent containing Si—H groups generally contains at least two or three Si—H groups and may have the general formula:

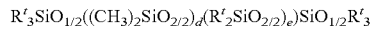

where each $R^t$ may be an alkyl group having 1 to 4 carbon atoms or hydrogen, d and e are 0 or any number such that d+e is from 8 to 400. Preferably the organopolysiloxane crosslinking agent containing Si—H groups comprises at least two or three methylhydrogensiloxane units. The crosslinking agent can for example be a poly(methylhydrogensiloxane) having trimethylsilyl terminal units or a dimethylsiloxane methylhydrogensiloxane copolymer having trimethylsilyl terminal units. The crosslinking agent can alternatively contain Si—H groups in a linked cyclic polyorganosiloxane structure. Such linked cyclic polyorganosiloxanes can be produced by reacting a cyclic polysiloxane containing at least two Si—H groups with a compound having aliphatic unsaturation or containing a hydroxy group, for example a silane or polyorganosiloxane having aliphatic unsaturation or containing a hydroxy group as described in U.S. Pat. No. 7,378,482.

Alternatively the cross-linking agent containing Si—H groups may be an MQ resin consisting of units of the general formula $SiO_{4/2}$ and $R^q{}_3SiO_{1/2}$ wherein at least three $R^q$ substituents in the MQ resin molecule are hydrogen atoms and the remainder are alkyl groups, or may be a rake or comb polymer comprising a polydiorganosiloxane chain containing one or more T or Q unit having a subchain of diorganosiloxane and organohydrogensiloxane units attached thereto.

It is preferred that the crosslinking agent containing Si—H groups has a viscosity of from 5 to 1000 $mm^2/s$ at 25° C., more preferably 20 to 350 $mm^2/s$, most preferably 50 to 300 $mm^2/s$. The crosslinking agent is preferably present in an amount such that the molar ratio of the total number of H groups in the coating composition to alkenyl groups in the composition is from 0.9:1 to 8:1, more preferably 1.1:1 to 4:1, most preferably 1.5:1 to 3:1. The crosslinking agent containing Si—H groups is typically present in an amount of 0.5 to 30% by weight based on the organopolysiloxane containing alkenyl groups.

The organopolysiloxane (B) (crosslinker) is present in the aqueous composition in an amount of from 0.01 to 15% wt, alternatively of from 0.1 to 10% wt, based on the total weight of the aqueous composition.

The hydrosilylation catalyst preferably comprises a platinum group metal that is a group VIII metal such as platinum, ruthenium, rhodium, palladium, osmium or indium. Suitable hydrosilylation catalysts include complexes or compounds of these platinum group metals, particularly platinum compounds or complexes including chloroplatinic acid, either in hexahydrate form or anhydrous form, and or a platinum-containing catalyst which is obtained by a method comprising reacting chloroplatinic acid with an aliphatically unsaturated organosilicon compound such as divinyltetramethyldisiloxane, platinum acetylacetonate, complexes of platinous halides with unsaturated compounds, for example, ethylene, propylene, organovinylsiloxanes and styrene, hexamethyldiplatinum, alkene-platinum-silyl complexes such as $(COD)Pt(SiMeCl_2)_2$, where COD is 1,5-cyclooctadiene and Me is methyl, $PtCl_2.PtCl_3$ and $Pt(CN)_3$. Alternatively the catalyst may be a rhodium complex, for example, $RhCl_3(Bu_2S)_3$. The catalyst is typically used at 40 to 250 parts per million by weight platinum (or other group VIII metal) based on the weight of organopolysiloxanes in the coating composition.

The hydrosilylation catalyst (C) is present in the aqueous composition in an amount of from 0.0001 to 0.02% wt, based on the total weight of the aqueous composition.

A curable organopolysiloxane composition comprising an organopolysiloxane containing alkenyl groups, an organohydrogenpolysiloxane and a hydrosilylation catalyst may contain a cure inhibitor, as is known in silicone release coatings. Examples of suitable inhibitors include acetylenic compounds such as dimethyl hexynol (3,5-dimethyl-1-hexyn-3-ol), methyl butynol, or ethynyl cyclohexanol, and maleates such as bis(methoxylmethylethyl)maleate or diallylmaleate. If used, an inhibitor can for example be used at 0.01 to 3% by weight of the organopolysiloxane composition.

The organic copolymer (D) comprises at least two different types of repeating units. Unit (i) is an alkyl group comprising from 2 to 12 carbon atoms and unit (ii) is an alkyl group comprising from 2 to 12 carbon atoms and having at least one pendant alcohol substituent.

The alkyl units (i) can be preferably mainly composed of 2 carbon atoms. Such alkyl units are typically called ethylene units because they are formed from ethylene monomer although typically no unsaturation is present anymore after manufacture of the polymer. The alcohol containing units (ii) are typically alkyl units containing 2 carbon atoms one of them bearing an alcohol (also called hydroxy or hydroxyl) group. Such units are typically called vinyl alcohol units although typically no unsaturation is present anymore after manufacture of the polymer.

The copolymer (D) can comprise other types of units for example it can comprise unit (iii) being an alkyl group having at least one pendant substituent such as ester, typically acetate. Such unit is often called vinyl ester unit.

The content of ethylene units in the copolymer (D) is preferably 0.1 to 20 mol %, more preferably 1 to 15 mol %, even more preferably 2 to 13 mol %, and particularly preferably 3 to 10 mol %. When the content of ethylene units is too high, the solubility of the copolymer in water will be reduced.

The total content of vinyl alcohol units and vinyl ester units in the copolymer (D) is preferably 80 to 99.1 mol %. The content of vinyl alcohol units is preferably 85 to 99 mol %, more preferably 87 to 98 mol %, and particularly preferably 90 to 97 mol %. If the content of vinyl alcohol units is less than 85 mol %, the solubility of the copolymer in water will be reduced. The content of vinyl ester units is preferably 0.1 to 15 mol % and more preferably 0.1 to 10 mol %.

The organic copolymer (D) is present in the aqueous composition in an amount of from 0.5 to 14% wt, alternatively of from 1 to 14% wt, alternatively of from 1 to 12% wt, based on the total weight of the aqueous composition.

In some embodiments the composition further contains at least one of: hydrocolloid, polysaccharide, cellulose derivative, starch, alginate, carrageenan, gellan gum, locust bean gum, pectin, xanthan, guar gum, arabic gum. Such components are typically authorised for food indirect contact application by the regulations (indirect meaning in this context that the material is in contact with the food but not within food). Such components may contribute to improve final properties of the coated substrate such as decreasing the permeability of the substrate and improve printability. They can also contribute to advantageously modify the viscosity of aqueous compositions in blend with the organic copolymer (D).

In some embodiments, the composition further contains a component improving gas barrier properties of the cured coating such as, for example succinic anhydride derivative as mentioned above or another additional component.

An emulsion can be formed by subjecting the components A, B and C (organopolysiloxane containing alkenyl groups and/or organohydrogenpolysiloxane and/or hydrosilylation catalyst), water and appropriate surfactant to high shear, for example in a mixer of the rotor and stator type or in an apparatus applying increased shear such as a homogeniser or microfluidiser, or a sonolator (ultrasonic mixer).

To avoid premature reaction of a curable organopolysiloxane composition in the homogenising equipment, it may be preferred that not all the components of the organopolysiloxane composition are emulsified together. For example, the major part of the organopolysiloxane (A) may be emulsified in the absence of crosslinking agent (B), with the crosslinking agent (B) being added to the coating composition subsequently. For some curing chemistries, the organopolysiloxanes (A) and (B) in the composition may be emulsified in the absence of catalyst, with the catalyst being added to the coating composition subsequently.

The organic copolymer (D) is typically a solid that is water soluble or water dispersible at ambient temperature or at elevated temperature up to 99° C. The organic copolymer (D) can be added to the organopolysiloxane composition as a solid diluted with water before applying the curable organopolysiloxane composition on the substrate. In other embodiments, the organic copolymer (D) is added to one of the emulsion parts. For example it can be added to the emulsion containing organopolysiloxane (A) and/or to the emulsion containing organopolysiloxane (B) and/or the emulsion containing hydrosilylation catalyst (C).

If the coating composition needs to be transported, or to be stored for later use, it may be preferred that the composition is stored in separate packages, for example with the major part of the organopolysiloxane (A) being stored separately from the crosslinking agent (B), or with an organopolysiloxane (A) and crosslinking agent (B) being stored separately from a catalyst (C). One or both of these packages can conveniently comprise organic copolymer (D).

For example, when the reactive organosilicon material is a curable organopolysiloxane composition comprising an organopolysiloxane containing alkenyl groups, an organopolysiloxane containing Si—H groups and a hydrosilylation catalyst, the organopolysiloxane containing alkenyl groups can be stored stably with either the organopolysiloxane containing Si—H groups or with the hydrosilylation catalyst. The organopolysiloxane containing Si—H groups and the hydrosilylation catalyst are less stable on storage together. A composition (I) comprising the organopolysiloxane containing Si—H groups and a composition (II) comprising the hydrosilylation catalyst be separately homogenised to form an emulsion. The organopolysiloxane containing alkenyl groups can be mixed with either of these compositions; preferably both compositions (I) and (II) comprise an organopolysiloxane containing alkenyl groups. The emulsions thus formed can be packaged separately if necessary and can be mixed with each other and optionally with organic copolymer (D) solution when the coater is ready to use the coating composition. Alternatively one or both compositions can be mixed with organic copolymer (D) solution before storage.

When present, the optional additional components can be premixed with the organic copolymer (D) so that a blend or reaction product of the additive and copolymer (D) is obtained.

When finally prepared, before curing, the aqueous composition comprises at least
1 to 60% wt of organopolysiloxane (A),
0.01 to 15% wt of organohydrogenpolysiloxane (B),
0.0001 to 0.01% wt of hydrosilylation catalyst (C),
0.5 to 14% wt of organic copolymer (D), and
water to reach a total of 100% of the total composition.

The composition may also contain the inhibitor in an amount of from 0.01 to 3% by weight of the aqueous composition.

The aqueous composition as described above is then applied to a substrate and allowed to cure. The application and curing of the aqueous composition on the substrate is carried out by known methods in the field of paper coating, such as calendaring, coating.

The curable aqueous organopolysiloxane composition containing the organic copolymer (D) as defined above permits to obtain after cure a coating which can be at the same time food approved, greaseproof, waterproof, air impermeable, baking release resistant.

The good greaseproof properties obtained with compositions according to the present invention are surprising as it is even significantly higher than with the organic copolymer (D) alone while organopolysiloxane compositions alone are known to be unable to provide significant greaseproof ness. It seems thus that there is a synergistic effect between the organopolysiloxane components and the organic copolymer (D) as demonstrated later in the present description by results of NFA and KIT tests.

Typically the coating after cure has a silicon weight (measured as explained hereinafter) of maximum 4 g silicon per square meter. A silicon coat weight of X $g/m^2$ is usually associated with a coating thickness of approximately X micron.

The invention is illustrated by the following Examples, in which parts and percentages are by weight unless otherwise noted.

Description of Tests:
Silicon Coat Weight Measurement:

Silicon coat weights were measured by X-ray Fluorescence using an Oxford lab-x3500 XRF Analyser after silicon elemental calibration with standards. An XRF measurement of a blank substrate was performed prior to 3 measurements of coated-paper samples leading to an average silicon coat weight or thickness expressed in $g/m^2$.

Water Resistance or Cobb60 Test:

The water resistance of paper substrates was tested by the conventional absorption test known as Cobb test described for instance in TAPPI 441 om-04 test method. Samples were exposed to water for 45 seconds and the amount of water absorbed after a total of 60 seconds was measured by weight. The "Cobb value" represents the mass of absorbed water expressed in $g/m^2$. The lower the Cobb value, the higher the water resistance of the substrate. A Cobb60 of less than 20 $g/m^2$, alternatively less than 15 $g/m^2$, is desired.

Grease Resistance:

A) KIT Test:

Grease resistance test for paper substrates was evaluated following 3M Kit test described in TAPPI 559 cm-12 procedure: 'Grease Resistance Test for Paper and Paperboard'. A drop of a fresh Kit solution (Kit number 1 to 12 from least to most aggressive) made from a combination of Castor oil, n-heptane and toluene at various ratios, was contacted with the substrate. After wiping off with a clean tissue, the area was immediately examined. A failure was denoted by a darkening or staining of the area. The procedure was repeated using a less aggressive solution until no stain was observed being considered as a "pass". Oil repellency of the paper was recorded by the maximum kit number for which the drop did not penetrate the paper. The greater the Kit number, the better the oil repellency. A Kit number of 4 or greater measured at a Si coat weight of below 2 $g/m^2$, alternatively Kit of 6 or greater at a Si coat weight of below 1 $g/m^2$, and alternatively Kit of 8 or greater, is desired.

B) NFA Test:

A more stringent grease resistance test method for paper substrates was described by Solvay Solexis S.P.A. for instance in EP 1690882, and was known as the New Fatty Acid or NFA test. A set of test solutions was prepared with various amounts of castor oil, oleic acid, and octanoic acid. Each test solution was ranked from 1 to 11, with the aggressiveness of the solutions increasing with the rating number. The solutions were heated to 60° C. and a drop of each was placed on the paper sample. The test paper was placed in a 60° C. oven for 5 minutes. The drop was wiped off prior to examining the paper; a failure was indicated by the darkening or discolouring of the test paper. The paper was given the score of the highest number of solution that can be applied without failure. The higher the NFA number the better is the grease resistance of the paper substrate.

Bakery Release Test:

The bakery release or baking test measured the quantity of food left on a substrate after oven baking and release. Coated paper samples were folded into moulds and weighed. Cakes containing 4 eggs, 80 g of sugar, 80 and 85 g of potato and wheat flours respectively, and 5.5 g of baking powder were processed at room temperature with a universal kitchen machine and placed into the moulds prior to oven baking. The baking time in the oven is 8 minutes at a temperature of 225° C. The finished baked products were cooled down. The coated paper to be tested was then removed from the baked product and the quantity of baked product still adhering to the paper was weighed and converted in $g/m^2$. The lower the bakery release values the better. A bakery release of below 80, alternatively below 60 $g/m^2$, is desired.

Alternative Release Test:

An alternative discriminating release test was used using a 20 mm width and 180 mm length adhesive tape applied on the coated paper and subsequently released. The release force required to detach the adhesive tape form the coated paper was measured on a Lloyd LRX Plus tensile testing machine. This test was less-time consuming and required less operator skills since it was semi-automated compared to the above bakery release test. 3 or more measurements were performed and an average value was calculated and expressed in cN/inch. The lower the release value the better the release coating. A tape release of below 60, alternatively below 40 cN/inch, was desired, corresponding to the best coated paper performances as also confirmed by the bakery release test.

Anchorage or Abrasion Resistance Test:

The anchorage test provided a quantitative determination of the rub-off resistance of silicone release coating anchoring on the substrate after an abrasion test. The silicon content of a coated substrate was determined by XRF before and after rub-off with an abrasion tester and was expressed as a % of Si left after rub-off compare to 100% initially coated. The higher the Si % left after rub-off the higher the anchorage or abrasion resistance.

Air Permeability Test or Gurley Test:

The air permeability or air resistance of different paper substrates was measured with an L&W Air Permeance Tester by sensing the air flow through the sample and the pressure difference across the two sides. The tester had a wide measuring range and was therefore able to measure grades of paper with high or low permeance. Standard test methods such as SCAN-P 26:78 or TAPPI 536 om-12 for 'Resistance of paper to passage of air (high-pressure Gurley method)' were applied. The air permeance (permeability) was measured as the time, expressed in Gurley seconds or Gurley unit, for a given volume of air to pass through a test specimen such as a circular area of paper using a pressure differential of approximately 3 kPa. The higher the air permeance time in Gurley, the lower the air permeability of a paper specimen, the better the barrier is towards air and more generally towards gas. A high air barrier is generally considered as indicating a high grease barrier.

Printability Test:

The printability of the paper substrates was assessed by either marking the sample with an alcohol-free water-resistant marker pen or printing a standard image in black and red colours using a DTG printer ('Direct To Garment') e.g. supplied by Aeoon. Quality printing performances were visually assessed such as ink transfer, drying and durability with no smearing or smudging, printing uniformity, intensity and contrast, sharpness of details, lines and boundaries, etc. Results were rated as:

Excellent: fast drying, no smearing, uniform with distinct boundary between the printed part and unprinted part.

Good: longer drying with some smearing, slightly non-uniform with a slightly blurred boundary between the printed part and the unprinted part.

Poor: long drying with smearing or smudging, appreciably non-uniform, blurred printing, poor sharpness of printing areas.

DESCRIPTION OF EXAMPLES

EVOH Solution Preparation (Examples of Organic Copolymer (D)):

An ethylene-vinyl alcohol copolymer EVOH solution was prepared by dispersing EVOH in water. The solution was heated up to 95° C. under stirring until full dissolution and then cooled down. Alcohol could be added to promote fast dissolution as necessary. A 10 to 50 wt % EVOH solution was prepared and was stable upon storage conditions. Alternatively EVOH solution was pre-reacted with Octenyl Succinic Anhydride OSA or simply mixed to form a 10 wt % EVOH/OSA solution. Examples of ethylene-vinyl alcohol copolymer EVOH were Kuraray Exceval RS-1113, RS-1713, RS-1717, RS-2117, RS-2817, RS-4101, HR-3010 or AQ-4104 upon the paper application targeted e.g. food wrapping and/or food baking.

Silicone-Emulsion Coating Bath Preparation:

A curable organopolysiloxane Emulsion (I) containing vinyl-functional polydimethylsiloxane, poly(methylhydrogensiloxane), surfactants and water was mixed with a curable organopolysiloxane Emulsion (II) containing vinyl-functional polydimethylsiloxane, Pt-based hydrosilylation catalyst, polymerization inhibiting agent, surfactants and water in a typical A:B ratio of 80:20 to 97:3. Emulsions (I) was selected from e.g. Dow Corning Syl-Off 7920, 7950, 7976, 7978, 7990 and Emulsion (II) from e.g. Dow Corning Syl-Off 7922, 7923, 7924, 7975. Antifoam such as Dow Corning Syl-Off EM 7989 was also added. The emulsion blend was further diluted with water to reach a silicone content from 3 to 50 wt % and more often from 10 to 20 wt %.

Paper Coating Process Conditions:

The coating emulsion was applied with a bench top rotary printing and coating machine called "The Rotary Koater" from RK print-Coat Instrument Ltd. This equipment was able to coat 30 cm wide up to 120 g/m² paper roll with various coating heads and coating rolls types. A plain roll was preferred for the examples described below and the paper speed was set at 7 m/minutes to get silicone coat weight of 0.05 to 5.0 g/m². The coating was cured and dried in-line with an oven at 120 to 180° C. The coated paper was cut in sheets and tested for a large set of tests: silicon coat weight, water resistance or Cobb, grease resistance or KIT or NFA, bakery release, Anchorage or abrasion resistance, air permeability or gas barrier, printability.

Comparative Examples C1-C3

Comparative example C1 was a surface untreated standard paper used as the substrate in the manufacturing of food packaging such as for bakery paper application.

Comparative example C2 was a commercially available fluoroalkyl-treated paper from Krpa Paper.

Comparative example C3 was a commercially available chromate-treated paper of Quilon® type.

Comparative Examples C4-C7

200 g of the silicone-coating bath was prepared by mixing 14 g to 57 g of Emulsion (I), 0.75 g to 3 g Emulsion (II), 0.1 g antifoam emulsion and completed with tap water. The coating bath was mixed with an impeller at low speed for 5 min. It was allowed to stand for another 15 minutes prior to the coating step. The coating was applied to an uncoated paper referred as C1, cured and dried as per the process conditions described above.

Comparative Examples C8-C11

200 g of EVOH-coating bath was prepared by mixing 40 g to 120 g of an EVOH solution at 10 to 15%, diluted and mixed with tap water with an impeller at low speed for 5 min. It was allowed to stand for another 15 minutes prior to the coating step. The coating was applied to uncoated paper referred as C1, cured and dried as per the process conditions described above.

An antifoam emulsion may typically be present to avoid foaming in the coating bath, but it is not a mandatory ingredient for the purpose of the invention. That is, the antifoam emulsion is not contributing to the technical solution provided by the present invention.

Examples 1 to 18: Silicone+EVOH Coating Bath 200 g of a coating bath made of a combination of silicone emulsion and EVOH was prepared by mixing 40 g to 120 g of an EVOH solution at 10 to 15%, 14 g to 57 g Emulsion (I), 0.75 g to 3 g Emulsion (II), 0.1 g antifoam emulsion and completed with tap water. The coating bath was mixed with an impeller at low speed for 5 min. It was allowed to stand for another 15 minutes prior to the coating step. The coating was applied to uncoated paper referred to as C1, cured and dried as per the process conditions described above.

The respective final % wt of silicone and EVOH in the aqueous composition are indicated in the Tables 2-6 below.

Details of preparation baths of Examples 6, 9 and 14 is provided here below in Table A. The other Examples were prepared in a similar manner, with the amounts adapted to account for the desired percentage by weight of silicone and EVOH in the various compositions, as disclosed in Tables 2-6 below.

TABLE A

| | Amounts in grams | | |
|---|---|---|---|
| | Example 6 - Si/EVOH-coated paper (Si 8%- RS1717 8%) | Example 9 - Si/EVOH-coated paper (Si 2%- RS2117 6%) | Example 14 - Si/EVOH-coated paper (Si 12%- HR3010 5%) |
| Emulsion (I) | 38.0 | 9.5 | 57.0 |
| Emulsion (II) | 2.0 | 0.5 | 3.0 |
| Antifoam emulsion | 0.1 | 0.1 | 0.1 |
| EVOH | 106.67 (solution @ 15%) | 120 (solution @ 10%) | 100.0 (solution @ 10%) |
| Water | 53.23 | 69.9 | 39.9 |
| Total (g) | 200 | 200 | 200 |

Examples 19 to 22: Silicone+OSA-EVOH Coating Bath 200 g coating bath made of a combination of silicone emulsion and EVO/OSA additives was prepared by mixing: 40 g to 120 g of an EVOH-OSA solution at 10 to 15%, 14 g to 57 g Emulsion (I), 0.75 g to 3 g Emulsion (II), 0.1 g antifoam emulsion and completed with tap water. The coating bath was mixed with an impeller at low speed for 5 min. It was allowed to stand for another 15 minutes prior to the coating step. The coating was applied to uncoated paper referred to as C1, cured and dried as per the process conditions described above.

The respective final % wt of silicone and EVOH in the aqueous composition are indicated in the Tables 2-6 below.

Comparative Examples C12, and C13 and Example 23: PVA Comparison to EVOH

Comparative example C12 is a repeat of Comparative example C5.

Comparative example C13: 200 g of a coating bath made of a combination of silicone emulsion and PolyVinylAlcohol (also called PVA or PVOH) was prepared by mixing 40 to 120 g of a PVA solution at 10 to 15%, 14 g to 57 g Emulsion (I), 0.75 g to 3 g Emulsion (II), 0.1 g antifoam emulsion and completed with tap water. The coating bath was mixed with an impeller at low speed for 5 min. It was allowed to stand for another 15 minutes prior to the coating step. The coating was applied to uncoated paper referred as C1, cured and dried as per the process conditions described above.

Example 23: 200 g of a coating bath made of a combination of silicone emulsion and EVOH was prepared by mixing 40 g to 120 g of an EVOH solution at 10 to 15%, 14 g to 57 g Emulsion (I), 0.75 g to 3 g Emulsion (II), 0.1 g antifoam emulsion and completed with tap water. The coating bath was mixed with an impeller at low speed for 5 min. It was allowed to stand for another 15 minutes prior to the coating step. The coating was applied to uncoated paper referred to as C1, cured and dried as per the process conditions described above.

Results:

Comparative examples C1-C7 in Table 1: Blank paper vs. fluoroalkyl- or chromate- or silicone-treated papers.

TABLE 1

| Example # | Description | Si coat weight (g/m$^2$) | Cobb (g/m$^2$) | KIT test number | NFA test number | Bakery release (g/m$^2$) |
|---|---|---|---|---|---|---|
| C1 | Uncoated paper | 0 | 22.2 | 0 | 0 | 77.8 |
| C2 | Fluoroalkyl-coated paper[1] | 0 | 27.1 | 12 | 4 | 80.0 |
| C3 | Chromate-coated paper[2] | 0 | 16.9 | 12 | 1 | 71.5 |
| C4 | Silicone-coated paper | 0.17 | 14.1 | ≤1 | 0 | 24.0 |
| C5 | Silicone-coated paper | 0.19 | 13.5 | 0 | 0 | 23.6 |
| C6 | Silicone-coated paper | 0.31 | 13.3 | 1 | 0 | 18.8 |
| C7 | Silicone-coated paper | 0.71 | 10.6 | 0 | 0 | 7.9 |

[1]commercially available from Krpa Paper,
[2]commercially available Quilon ®-type paper.

The performance data reported in Table 1 indicate that a blank uncoated paper (C1) had a low water resistance, no grease barrier and a poor bakery release or baking resistance. Fluoroalkyls- or chromate-treated paper (C2 and C3, respectively) led to a slight water barrier improvement or decay and in both cases to significant grease barrier improvement and maintained poor baking resistance. Paper surface treatment with silicones led to improved water and baking resistances but no grease barrier (C4 to C7).

Examples 1-15—Table 2

Papers treated with Si emulsion combined with different ethylene vinyl alcohol copolymers (EVOH) and at various coat weight and dosages were prepared and evaluated, as listed in Table 2.

TABLE 2

| Example # | Description (% of Silicone and EVOH (with grade) in the final coating bath) | Si coat weight (g/m$^2$) | Cobb (g/m$^2$) | KIT test number | NFA test number | Bakery release (g/m$^2$) |
|---|---|---|---|---|---|---|
| C1 | Uncoated paper | 0 | 22.2 | 0 | 0 | 77.8 |
| C2 | Fluoroalkyl-coated paper | 0 | 27.1 | 12 | 4 | 80.0 |
| C3 | Chromate-coated paper | 0 | 16.9 | 12 | 1 | 71.5 |
| C4 | Silicone-coated paper | 0.17 | 14.1 | ≤1 | 0 | 24.0 |
| C5 | Silicone-coated paper | 0.19 | 13.5 | 0 | 0 | 23.6 |
| C6 | Silicone-coated paper | 0.31 | 13.3 | 1 | 0 | 18.8 |
| C7 | Silicone-coated paper | 0.71 | 10.6 | 0 | 0 | 7.9 |
| C8 | EVOH-coated paper (RS1717 6%) | 0 | 23.3 | 0 | 2 | 70.1 |
| 5 | Si/EVOH-coated paper (Si 8%-RS1717 4%) | 0.22 | 20.3 | 7 | 0 | 72.9 |
| 1 | Si/EVOH-coated paper (Si 8%-RS1717 6%) | 0.34 | 20.2 | 9 | 1 | 73.7 |
| 6 | Si/EVOH-coated paper (Si 8%-RS1717 8%) | 0.55 | 19.2 | 9 | 3 | 61.4 |
| C9 | EVOH-coated paper (RS2117 6%) | 0 | 22.1 | 7 | 1 | 56.1 |
| 7 | Si/EVOH-coated paper (Si 8%-RS2117 4%) | 0.23 | 15.4 | 8 | 1 | 60.9 |
| 8 | Si/EVOH-coated paper (Si 2%-RS2117 5%) | 0.05 | 22.8 | 8 | 2 | 71.6 |
| 9 | Si/EVOH-coated paper (Si 2%-RS2117 6%) | 0.07 | 21.7 | 10 | 2 | 69.6 |
| 10 | Si/EVOH-coated paper (Si 3%-RS2117 6%) | 0.17 | 20.6 | 12 | 2 | 72.0 |
| 2 | Si/EVOH-coated paper (Si 6%-RS2117 6%) | 0.39 | 18.6 | 12 | 7 | / |
| 11 | Si/EVOH-coated paper (Si 9%-RS2117 6%) | 0.46 | 12.8 | 11 | 8 | 33.7 |
| C10 | EVOH-coated paper (RS2817 6%) | 0 | 21.9 | 6 | 1 | 72.6 |
| 12 | Si/EVOH-coated paper (Si 8%-RS2817 4%) | 0.23 | 16.1 | 6 | 1 | 59.9 |
| 3 | Si/EVOH-coated paper (Si 8%-RS2817 6%) | 0.38 | 16.3 | 10 | 2 | 52.5 |
| 13 | Si/EVOH-coated paper (Si 8%-RS2817 8%) | 0.61 | 15.5 | 12 | 4 | 55.0 |
| C11 | EVOH-coated paper (HR3010 6%) | 0 | 20.0 | 4 | 2 | / |
| 14 | Si/EVOH-coated paper (Si 12%-HR3010 5%) | 0.30 | 14.8 | 8 | 1 | 55.9 |
| 4 | Si/EVOH-coated paper (Si 8%-HR3010 6%) | 0.24 | 14.3 | 8 | 1 | 51.3 |
| 15 | Si/EVOH-coated paper (Si 8%-HR3010 8%) | 0.36 | 12.5 | 9 | 3 | 39.8 |

The dosage of silicone (Si) in combination with EVOH were expressed in wt % in the diluted bath before coating.

The performance data reported in Table 2 indicate that Silicone-treated papers had improved water and baking resistance but very low grease barrier (C4 to C7). EVOH-treated papers led to some grease barrier improvement but at the expense of water and baking resistance (C8 to C11). The best compromise was obtained for the combination of silicone and EVOH-treated paper for which superior grease barrier was measured compared to papers treated with either silicones or EVOH, baking resistance was averaged and a good water resistance was maintained (Examples 1 to 15). Grease barrier for Examples 2 or 11 was even higher and bakery release significantly improved compared to fluoroalkyl- or chromate-treated paper references (C2 and C3, respectively) with higher water resistance for Example 11 compared to silicone-coated paper at same coat weight.

Examples 1, 3, 5, 6, 16-21: Papers treated with Si emulsions combined with EVOH or with EVOH and octenyl succinic anhydride (OSA) were prepared and evaluated for Abrasion resistance, as listed in Table 3.

TABLE 3

| Example # | Description (% of Silicone and EVOH (with grade) in the final coating bath) | Si coat weight (g/m$^2$) | Cobb (g/m$^2$) | KIT test number | Bakery release (g/m$^2$) | Anchorage (%) |
|---|---|---|---|---|---|---|
| C1 | Uncoated paper | 0 | 22.2 | 0 | 77.8 | N/A |
| C6 | Silicone-coated paper | 0.31 | 13.3 | 1 | 18.8 | 88.8 |
| C7 | Silicone-coated paper | 0.71 | 10.6 | 0 | 7.9 | 89.5 |
| C8 | EVOH-coated paper (RS1717 6%) | 0 | 23.3 | 0 | 70.1 | N/A |
| 5 | Si/EVOH-coated paper (Si 8%-RS1717 4%) | 0.22 | 20.3 | 7 | 72.9 | 92.8 |
| 1 | Si/EVOH-coated paper (Si 8%-RS1717 6%) | 0.34 | 20.2 | 9 | 73.7 | 93.2 |
| 6 | Si/EVOH-coated paper (Si 8%-RS1717 8%) | 0.55 | 19.2 | 9 | 61.4 | 94.2 |
| C9 | EVOH-coated paper (RS2117 6%) | 0 | 22.1 | 7 | 56.1 | N/A |
| 16 | Si/EVOH-coated paper (Si 6% RS2117 6%) | 0.25 | 15.5 | 7 | 46.1 | 92.0 |
| 17 | Si/EVOH-coated paper (Si 9% RS2117 6%) | 0.65 | 16.4 | 12 | 42.6 | 91.1 |
| 18 | Si/EVOH-coated paper (Si 8% RS2117 8%) | 0.68 | 13.9 | 12 | 53.0 | 94.1 |
| C10 | EVOH-coated paper (RS2817 6%) | 0 | 21.9 | 6 | 72.6 | N/A |
| 3 | Si/EVOH-coated paper (Si 8% RS2817 6%) | 0.38 | 16.3 | 10 | 52.5 | 92.0 |
| 13 | Si/EVOH-coated paper (Si 8% RS2817 8%) | 0.61 | 15.5 | 12 | 55.0 | 94.4 |
| 19 | Si/EVOH/OSA-coated paper (Si 8% RS2117 8%) | 0.38 | 14.6 | 10 | 44.7 | 92.5 |
| 20 | Si/EVOH/OSA-coated paper (Si 12% RS2117 6%) | 1.12 | 9.3 | 10 | 4.5 | 93.0 |
| 21 | Si/EVOH/OSA-coated paper (Si 12% RS2117 8%) | 2.00 | 12.5 | 9 | 5.2 | 97.0 |

The performance data reported in Table 3 indicate that whichever the silicone coat weight from below 0.3 to above 2 g/m$^2$, and the dosing of Si emulsion in combination with EVOH or EVOH/OSA, the anchorage of the coating or resistance to abrasion was superior to the reference silicone-coated paper (C6 and C7) leading to a good surface coverage and homogeneity and a superior resistance to dust formation as often observed at industrial scale processes. Moreover, the use of e.g. OSA co-additives enabled further water barrier improvement as well as significantly improved bakery release with baking residues below 10 g/m$^2$ while maintaining high grease resistance.

Examples 9, 10, 19, 20, 22: Papers treated with Si emulsions combined with EVOH or with EVOH and octenyl succinic anhydride (OSA) were prepared and evaluated for Air permeability, as listed in Table 4.

TABLE 4

| Example # | Description (% of Silicone and EVOH (with grade) in the final coating bath) | Si coat weight (g/m$^2$) | Cobb (g/m$^2$) | KIT test number | NFA test number | Bakery release (g/m$^2$) | Air permeability (Gurley) |
|---|---|---|---|---|---|---|---|
| C1 | Uncoated paper | 0 | 22.2 | 0 | 0 | 77.8 | 1,042 |
| C2 | Fluoroalkyl-coated paper | 0 | 27.1 | 12 | 4 | 80.0 | >45,000 |
| C3 | Chromate-coated paper | 0 | 16.9 | 12 | 1 | 71.5 | 703 |
| C6 | Silicone-coated paper | 0.31 | 13.3 | 1 | 0 | 18.8 | 1,099 |
| C7 | Silicone-coated paper | 0.71 | 10.6 | 0 | 0 | 7.9 | 1,200 |
| 19 | Si/EVOH-coated paper (Si 12% RS2117 3%) | 0.36 | 15.3 | 5 | 1 | 56.7 | 4,223 |
| 9 | Si/EVOH-coated paper (Si 2% RS2117 6%) | 0.07 | 21.7 | 10 | 2 | 69.6 | 16,667 |
| 10 | Si/EVOH-coated paper (Si 3% RS2117 6%) | 0.17 | 20.6 | 12 | 2 | 72.0 | 22,333 |
| 22 | Si/EVOH/OSA-coated paper (Si 12% RS2117 4%) | 0.66 | 12.8 | 7 | 1 | 31.4 | 29,667 |
| 20 | Si/EVOH/OSA-coated paper (Si 12% RS2117 6%) | 1.12 | 9.3 | 10 | 3 | 4.5 | >45,000 |

The performance data reported in Table 4 indicate that uncoated paper and silicone-treated papers whichever the thickness had a low air permeability (C1-C3 and C6-C7). Silicone and EVOH-treatment of papers led to a large increase in Gurley meaning a reduction of the air permeability of the surface treated paper (Examples 9, 10, 19, 20, 22). The best compromise in performances were obtained for papers treated with silicone, EVOH and OSA where grease, water and baking resistance were very high and the air permeability was so low that it was beyond the detection limit of the equipment (>45,000 Gurley—Example 20). As such gas barrier was very much improved.

Examples 1, 2, 5, 6: Papers treated with Si emulsions combined with EVOH were prepared and evaluated for Printability, as listed in Table 5.

TABLE 5

| Example # | Description (% of Silicone and EVOH (with grade) in the final coating bath) | Si coat weight (g/m²) | Cobb (g/m²) | KIT test number | NFA test number | Pen printing |
|---|---|---|---|---|---|---|
| C1 | Uncoated paper | 0 | 22.2 | 0 | 0 | Excellent |
| C2 | Fluoroalkyl-coated paper | 0 | 27.1 | 12 | 4 | Good |
| C3 | Chromate-coated paper | 0 | 16.9 | 12 | 1 | Excellent |
| C7 | silicone coated paper | 0.71 | 10.6 | 0 | 0 | Poor |
| C8 | EVOH-coated paper (RS1717-6%) | 0 | 23.3 | 0 | 2 | Excellent |
| C9 | EVOH-coated paper (RS2117-6%) | 0 | 22.1 | 6 | 0 | Excellent |
| C10 | EVOH-coated paper (RS2817-6%) | 0 | 21.9 | 6 | 1 | Excellent |
| C11 | EVOH-coated paper (HR3010-6%) | 0 | 20.0 | 4 | 2 | Excellent |
| 1 | Si/EVOH Coated paper (Si 8%/RS1717 6%) | 0.34 | 20.2 | 9 | 1 | Good |
| 2 | Si/EVOH Coated paper (Si 6%/RS2117 6%) | 0.39 | 18.6 | 12 | 7 | Poor* |
| 5 | Si/EVOH Coated paper (Si 8%/RS1717 4%) | 0.22 | 20.3 | 7 | 0 | Excellent |
| 6 | Si/EVOH Coated paper (Si 8%/RS1717 8%) | 0.55 | 19.2 | 9 | 3 | Good |

*DTG printing being good though.

The performance data reported in Table 5 indicate that the marker pen printing was expectedly good to excellent for Comparative examples C1-C3 and C8-C11 and poor for silicone-coated paper C7. However, the printability was significantly improved up to excellent by coating a combination of silicone-emulsion with EVOH additives (Examples 1, 2, 5 and 6). Furthermore the DTG printing was good for Example 2 while grease barrier was high.

Comparison was made between papers treated with PVA based compositions (C13) and EVOH based compositions (Example 23), as listed in Table 6.

TABLE 6

| Example # | Description (% of Silicone, PVA and EVOH (with grade) in the final coating bath) | Si coat weight (g/m²) | Cobb (g/m²) | KIT test number | NFA test number | Release force cN/inch |
|---|---|---|---|---|---|---|
| C1 | Uncoated paper | 0 | 22.2 | 0 | 0 | N.A.* |
| C12 | Silicone-coated paper | 0.22 | 14.8 | 0 | 0 | 28.8 |
| C13 | Si/PVA-coated paper (Si 6% PVA 6%) | 0.25 | 21.9 | 9 | 1 | 67.8 |
| 23 | Si/EVOH-coated paper (Si 6%-EVOH RS2117 6%) | 0.30 | 15.2 | 12 | 2 | 35.1 |

*the release force could not be measured since the paper was torn apart during the test and the force value was beyond the maximum force value of the equipment.

The performance data reported in Table 6 indicate that the silicone-coated paper (C12) provides both very good water resistance (low Cobb value) and release (low release force) performances compared to uncoated paper (C1). In the contrary and although Si/PVA coated paper provides some but insufficient grease barrier (C13), the addition of PVA is both detrimental for water resistance and release performances and annihilates the performance benefits observed for silicone-coated paper over the uncoated paper. Si/EVOH-coated paper (Example 23) provides the optimum performances benefits over the silicone- or silicone/PVA-coated papers (C12 and C13, respectively). The grease barrier is very high for the Kit test at maximum test scale of 12. The grease barrier by the NFA test is further improved while the water resistance and release performances remain superior and in the range required by the industry for premium grade grease/water barrier and low release force thus low food residues quality paper.

The invention claimed is:

1. An aqueous coating composition comprising at least the following components:
   a. An organopolysiloxane (A) which is a polysiloxane compound having at least two alkenyl groups per molecule,
   b. An organohydrogenpolysiloxane (B) which is a polysiloxane compound comprising at least two SiH groups per molecule, c. An hydrosilylation catalyst (C) able to catalyse an hydrosilylation reaction between the organopolysiloxane compound (A) and the organohydrogenpolysiloxane compound (B), d. An organic copolymer (D) comprising at least two types of repeating units:
   i. unit (i) which is an alkyl group comprising from 2 to 12 carbon atoms
   ii. unit (ii) which is an alkyl group comprising from 2 to 12 carbon atoms and having at least one pendant alcohol substituent, wherein the copolymer (D) is ethylene-vinyl alcohol copolymer or ethylene-vinyl alcohol-vinyl ester copolymer, and e. Water, and the composition is able to form upon curing by hydrosilylation a coating on a substrate.

2. The composition according to claim 1 wherein components (A) and (B) are comprised in one or more oil-in-water emulsions.

3. The composition according to claim 1 wherein the copolymer (D) is water-soluble or water-dispersible.

4. The composition according to claim 1 wherein the copolymer (D) comprises 0.1 to 20 mol % of ethylene units and the total content of vinyl alcohol units and vinyl ester units is from 80 to 99.9 mol %.

5. The composition according to claim 1 further containing at least one of:
   hydrocolloid, polysaccharide, cellulose derivative, starch, alginate, carrageenan, gellan gum, locust bean gum, pectin, xanthan, guar gum, arabic gum, latexes.

6. The composition according to claim 1 further containing maleic anhydride or succinic anhydride derivative preferably alkyl or alkenyl C3 to C20 derivative such as 2-methyl-2-propenyl, octyl, octenyl, dodecyl, dodecenyl succinic anhydride.

7. The composition according to claim 1 wherein the weight ratio of component (D) to the siloxane components (A) and (B) is comprised between 0.01 and 10.

8. The composition according to claim 1 wherein the components are present in separate parts or packages.

9. The composition according to claim 1 wherein the alkenyl groups of component (A) are vinyl groups.

10. The composition according to claim 9 wherein the H/Vinyl ratio range of components (A) and (B) is comprised between 1 and 3.

11. A greaseproof article comprising a substrate bearing a coating formed by applying the composition according to claim 1 on the substrate and curing such composition.

12. The greaseproof article according to claim 11 wherein the substrate is made of paper, acrylic material, polyethylene terephthalate or plastics/paper laminate.

13. The greaseproof article according to claim 12 wherein the article is in the form of a sheet, bag or container.

14. The greaseproof article according to claim 12 wherein the article is used for food packaging.

15. The greaseproof article according to claim 12 wherein the coating has a silicon coat weight of maximum 4 g/m$^2$.

16. A process of forming a coating on a substrate using the composition according to claim 1.

17. The process according to claim 16 wherein the composition is cured at a temperature comprised between 80 and 180° C.

18. A process for the preparation of a coating composition according to claim 1 wherein at least one of components (A), (B) and (C) is emulsified in one or more oil-in-water emulsions, and component (D) is dissolved or dispersed in water in one of the emulsions or as a separate part so that the components (A), (B), (C) and (D) are mixed together, and cured to form a coating.

19. A method comprising: applying the composition of claim 1 on a substrate, curing the composition to form a coating, wherein the coating provides at least one of the following properties greaseproof ness, food release, anti-adhesive release, air barrier, waterproofness, gas, water vapour barrier, and printability.

* * * * *